Figures 1, 2:
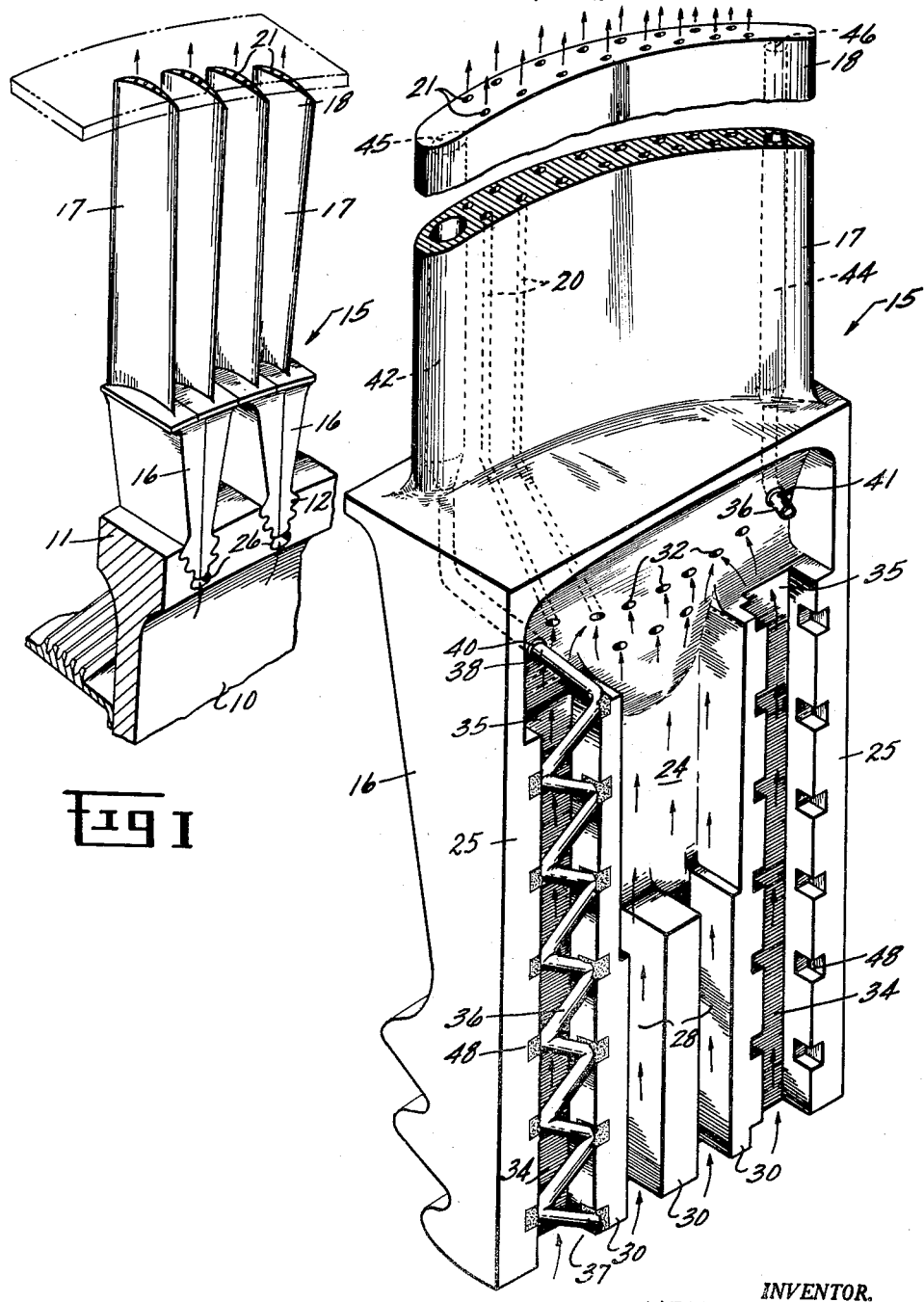

Jan. 5, 1965     H. E. LYNCH     3,164,367
GAS TURBINE BLADE
Filed Nov. 21, 1962

INVENTOR.
HENRY E. LYNCH
BY
Harry C. Burgess
ATTORNEY

United States Patent Office 3,164,367
Patented Jan. 5, 1965

3,164,367
GAS TURBINE BLADE
Henry E. Lynch, Cincinnati, Ohio, assignor to General
Electric Company, a corporation of New York
Filed Nov. 21, 1962, Ser. No. 240,203
5 Claims. (Cl. 253—39.15)

The present invention relates to a blade or airfoil and, more particularly, to a turbomachine blade or airfoil having heat exchange means utilizing both a liquid and a gaseous cooling medium to cool respective areas of the airfoil in high temperature operating environments.

As turbomachine design becomes more and more advanced, in the case of gas turbines, for example, the problems associated with increased operating temperatures become more troublesome. For instance, gas turbine engines designed for use in advanced jet-powered aircraft must be capable of withstanding the effects of higher inlet (ram air) temperatures, higher combustor performance and, specifically, higher turbine inlet temperatures. As is well known, it is conventional practice to design turbine blades or vanes (airfoils) using stress-rupture and fatigue life factors based on stresses and temperatures expected to be encountered at the airfoil extremities. For a given turbine configuration, however, stress cannot be lowered significantly so life must be enhanced by reduction in the effect of operating temperatures. In advanced engines the blades or airfoils must usually be supplied with a cooling or heat exchange medium. Presently by far the majority of high temperature blades are convection cooled, by means of air passing over portions of the blade or, which is more typical, by air directed through holes or passages in the blade (airfoil) or in the blade walls, in the case of hollow blades.

Use of cooling air alone, however, in the manner described above, is limited by reason of the fact that in advanced gas turbine engine applications the coefficient of heat transfer of the internal coolant—air—is at least 30–50% lower than that of the external fluid—combustible gas. In addition, realization of the maximum potential of the coolant requires an internal surface substantially equal to the external surface, with the surfaces being separated by an extremely thin wall—a practical impossibility in gas turbine engine blade design. Furthermore, even if this perfection of design could be attained, the internal coolant would pick up so much heat from the base or root area of the hollow blade that the tip section temperatures would approach the melting point of the blade materials commonly used in today's advanced jet engines.

The considerations discussed above have led to the conclusion that increased effectiveness of the cooling means and method must be accomplished. Cooling effectiveness may be algebraically defined as follows:

$$\text{Effectiveness} = \frac{T_g - T_m}{T_g - T_c}$$

where $T_g$=temperature of the combustible gas
$T_m$=temperature of the blade material (metal)
$T_c$=temperature of the cooling medium While an effectiveness of .3 has been found to be adequate for short life components or relatively low speed applications for high-Mach military aircraft or long life commercial usage, it has been determined that an effectiveness of .6, or higher, must be attained. Such is beyond the known capabilities of even perfect utilization of cooling air by itself. In arriving at a solution to the problem of increased cooling effectiveness in advanced gas turbine engine components, in particular, turbine rotor blades and vanes, it must be kept in mind that the problem differs depending on which portion of the blade (airfoil) is being considered. That is, the leading and trailing edges of the blade are more difficult to cool because of their remoteness from the hollow center of the blade and their higher heat transfer coefficients. Thus, while the other portions of the blade may be cooled adequately by a conventional method, such as convection currents of air, the leading and trailing edges require higher effectiveness of the cooling medium.

Accordingly, a general object of the present invention is to provide a gas turbine rotor blade or vane (airfoil) having higher operating temperature capabilities through improved cooling effectiveness.

A more specific object of the present invention is to provide a gas turbine rotor blade or vane having higher operating temperature capabilities through use of a gaseous (convection) coolant and a liquid (conduction) coolant in combination to improve overall cooling effectiveness.

In carrying out these, and other objects of my invention, one embodiment comprises a turbine rotor blade or airfoil having a plurality of longitudinally extending passages drilled, or otherwise formed, in the main or body portion of the airfoil, two of which are provided, respectively, in the leading and trailing edges of the airfoil. Heat exchange or condenser means are provided in a cavity in the root or base portion of the blade including a pair of tubes connected to the leading and trailing edge passages, respectively, the tubes being filled with an alkaline metal to be utilized as a liquid coolant in combination with a gaseous coolant introduced into the cavity, the gas passing over the tubes and through the blades passages connected to the cavity.

Other objectives and many of the attendant advantages of this invention will be readily appreciated as the same become better understood by reference to the following detailed description, including the accompanying drawings in which:

FIGURE 1 is a fragmentary view, partially in cross-section, of a section of a turbine rotor disk rim area showing the external configuration of a typical cooled turbine rotor blade; and FIGURE 2 is a perspective view, partially in cross-section, of a turbine rotor blade featuring the improved cooling arrangement of the subject invention.

Turning now to FIGURE 1, illustrated therein is a fragmentary section of a rotor wheel or disk 10 having an enlarged rim area 11 including an axial slot 12 adapted to receive an elongated shank turbine blade, indicated generally at 15, of the so-called "dual bucket" variety as shown and described in the patent to Davis et al.—3,034,764—of common assignment. It should be understood, however, that the present invention is not limited in use to this type of blade or airfoil but may equally be advantageous when embodied in other types of single or double-shanked blades or "buckets." It will be seen from the drawing that each section of the "dual bucket" or blade 15 includes a base or root portion 16, a body or airfoil portion 17, and a tip portion 18. As seen in FIGURES 1 and 2, a plurality of longitudinally-extending passages 20 are formed in the substantially solid airfoil or body portion of the blades, the passages preferably having openings 21 (except as described hereinbelow) at the tip portion for discharge of cooling fluid (gaseous).

Referring specifically now to FIGURE 2, the details of the one described embodiment of the invention should become more apparent. As shown therein, each of the "mirror-image" blade bases 16 is hollowed out to form generally rectangular blade root cavity 24 having opposing end walls 25—25 into which a cooling fluid, in this instance air, is introduced through suitable means, such as, for example, a passage 26 at the radially innermost end of the cavity or blade root and in the rotor wheel connected to a source of air (not shown). Some of the air (small arrows) which is discharged into the blade base or root cavity passes through slots 28 formed between longitudinally-extending rectangular ribs 30 cast or otherwise formed in the walls of the cavity. These slots may also be formed by corrugated inserts or other means known in the art, and may comprise more than the number illustrated. In any event, this air passes directly into the body or airfoil portion through openings 32 at the inner ends of the plurality of longitudinal passages 20 which extend inwardly to connect with the cavity. The remainder of the air introduced to the cavity is directed to elongated slots 34 located adjacent opposing end walls 25 of the shank cavity 24 viewed axially with respect to the rotor disk. Each slot or passage 34, which may comprise more than the one shown, is also open to the root cavity 24 at its radially outer ends at 35. This arrangement is provided in order that the air passing through slots 34 may eventually also pass through the openings 32 to aid in convection cooling of the center portion of the blade body. While passing through each of the slots 34, however, the air contacts a vessel or tube, one of which is shown installed at 36. These tubes or vessels are configured in zig-zag, spiral or otherwise sinuous form to present a larger surface area than would be the case if the tubes extended in a straight line from one end of each slot 34 to the other. Each tube 36 is sealed at 37, at its inner end, the other end 38 being left open but in sealing engagement—by being brazed or welded—with openings 40 and 41 leading, respectively, to enlarged longitudinally-extending passageways 42 and 44 in the leading and trailing edges, also respectively, of the blade airfoil or body portion 17.

Originally passageways 42 and 44 also lead to openings in the tip portion 18, similar to openings 21. However, in assembling the blade elements described herein, after the tubes have been placed in the blade root cavity and sealed to the openings 40 and 41, air is evacuated from the passageways (and tubes) and an alkaline metal, such as, for example, sodium or potassium, is then inserted and the outer openings plugged, as shown at 45 and 46. In addition, the tubes are secured, by welding or brazing, at notches 48 in the rib edges, to provide both accurate positioning and the support necessary to counteract the effects of centrifugal force during operation of the turbomachine. It should be understood, however, that, alternatively, the tubes may be cast or otherwise integrally formed with the blade material comprising the ribs and the root cavity walls. In any event, the tubes and the cavity ribs provide heat exchange or condenser means to aid in cooling the blade airfoil or body portion as hereinnow described.

The alkaline metal, whether it be sodium or potassium, is selected to match the desired temperatures of the blade metal and the air (gas) coolant temperature during normal (e.g., cruise) operating conditions. Therefore, in addition to the convection circuit cooling provided by the air passing through the slots 28 in the root cavity, and into the longitudinal passages 20 in the body, the metal coolant is also capable of convective circulation since it will become liquid at the operating temperature levels. Centrifugal force will also influence movement of the liquid coolant since as the liquid metal is forced toward the outer ends of the passages 42 and 44, it will become subjected to the heat of the combustible gas stream passing through the gas turbine. By reason of the liquid wetting the passage walls transfer of heat to the liquid occurs by conduction and the liquid is at least partially vaporized. The vapor, being lighter than the liquid, is forced inwardly because (1) it is less subject to the influence of centrifugal force than the liquid and (2) the liquid tends to displace it in the outer portion of the passageway. In the disclosed arrangement the air, which is sufficient to cool the middle portion of the blade body or airfoil portion, is also available to remove some of the heat of the vapor—by conduction through the zig-zag tube walls—to cause the metal to again become liquid and continue the cooling cycle. Thus, contrary to previous practice, the invention makes possible a higher effectiveness in cooling the leading and trailing edges—the hot spots—while utilizing an established method of cooling the lower temperature central portion of the blade body, by uniquely combining the liquid (metal) and gaseous (air) coolant properties in a heat exchanger configuration wherein a large amount, e.g., 25% or more, of the available convection (gas) coolant is also utilized as a heat sink for the liquid coolant.

It will therefore be realized that the invention provides what is lacking in the previously taught cooling arrangements, namely a heat sink or exchanger having substantially the same provisions for heat removal as the heat source, e.g., area, temperature difference, and coefficient of heat transfer. In other words, the condenser means, i.e., the tubes and slots (ribs 30) in the cavity 24, have an area roughly equivalent to that of the airfoil surface and the external or convective coolant is of low temperature and high velocity to promote a higher heat transfer rate than would be possible with use of the liquid (metal) coolant alone. It is also important to note that contrary to devices wherein the *entire* airfoil is cooled by the liquid-vapor (metal) coolant, the present invention utilizes the liquid metal (sodium, for example) to cool *only* the leading and trailing edges of the airfoil—a much more efficient and effective method. While the described embodiment shows the condenser cooling air being used as an additional or auxiliary coolant to cool the airfoil center section, it should be pointed out that for extremely high temperature applications this air may be discharged into the main gas stream and additional unheated air introduced into the passages 20 through slots 28 directly.

Other embodiments and modifications of the described invention as are within the scope of the invention and capable of being practiced using the skill of the art are intended to be covered by the appended claims.

What I claim as new and novel is:

1. In a rotor blade for a hot gas turbomachine:
   an airfoil portion having leading and trailing edges and a tip portion;
   a blade root portion having a cavity substantially enclosed thereby, said cavity having an opening therein for the supply of a first heat exchange medium thereto;
   a first plurality of passages in said airfoil portion in flow communication with said cavity;
   a second plurality of passages located in said leading and trailing edges of said airfoil portion;
   and heat exchanger means in said cavity, said heat exchanger means containing a second heat exchange medium in flow communication with said second plurality of passages, wherein at least a portion of said first heat exchange medium is in a heat exchange relationship with said second heat exchange medium during passage of said first medium through said cavity and into said first plurality of passages.

2. A rotor blade as claimed in claim 1 and wherein said heat exchanger means includes fluid tight vessels and supporting wall means therefor, said vessels containing said second heat exchange medium.

3. A rotor blade as claimed in claim 2 and wherein said vessels comprise a plurality of tubes sinuous throughout the length of said cavity and in sealing engagement with enlarged passages of said second plurality, and said wall means include ribs supporting said tubes and directing the passage of said first heat exchange medium over said sinuous tubes.

4. A rotor blade as claimed in claim 1 and wherein the surface area of said heat exchanger means in said cavity is substantially equal to the surface area of said airfoil portion cooled by said first and second heat exchange medium, respectively.

5. A rotor blade as claimed in claim 1 and wherein said first heat exchange medium is in the form of a gas and said second heat exchange medium is an alkaline metal selected to liquify at the normal turbomachine operating temperature.

References Cited in the file of this patent
UNITED STATES PATENTS

| | | |
|---|---|---|
| 2,565,594 | Constant | Aug. 28, 1951 |
| 2,699,917 | Colwell | Jan. 18, 1955 |
| 2,780,435 | Jackson | Feb. 5, 1957 |
| 2,888,241 | Stalker | May 26, 1959 |
| 3,014,692 | Turner | Dec. 26, 1961 |

FOREIGN PATENTS

| | | |
|---|---|---|
| 999,820 | France | Oct. 10, 1951 |
| 610,737 | Great Britain | Oct. 2, 1948 |